United States Patent [19]

Saito et al.

[11] 4,352,510
[45] Oct. 5, 1982

[54] SUPPORT BRACKET

[75] Inventors: Yoshihiro Saito, Yokohama; Shigeru Sakai, Fujisawa; Tsuneo Endo, Yokohama, all of Japan

[73] Assignee: Nissan Motor Company, Ltd., Yokohama, Japan

[21] Appl. No.: 43,700

[22] Filed: May 30, 1979

[30] Foreign Application Priority Data

Jun. 2, 1978 [JP] Japan .................... 53-74512[U]

[51] Int. Cl.³ .............................................. B60S 5/00
[52] U.S. Cl. ................................. 280/727; 180/70 R; 248/241; 248/274; 248/323
[58] Field of Search .................... 180/70 R, 70 P, 75; 280/727; 248/241, 274, 323

[56] References Cited

U.S. PATENT DOCUMENTS 3,608,851  9/1971  Anderson .............................. 248/15
3,799,481  3/1974  Anderson .............................. 248/15
3,880,444  4/1975  Bridges ................................. 280/661
4,026,578  5/1977  Mattson ............................... 280/661

FOREIGN PATENT DOCUMENTS 526455  2/1954  Belgium .
368900  3/1932  United Kingdom .
447588  5/1936  United Kingdom .
524258  8/1940  United Kingdom .
597239  1/1948  United Kingdom .
720049  12/1954  United Kingdom .
826046  12/1959  United Kingdom .
1186193  4/1970  United Kingdom .
1434918  5/1976  United Kingdom .

Primary Examiner—John P. Silverstrim
Attorney, Agent, or Firm—Thompson, Birch, Gauthier & Samuels

[57] ABSTRACT

The present invention relates to a bracket which can mount different units to a vehicle body without the use of additional spacers or the like. The bracket has an offset support bolt so that upon the bracket being seated in a 180 degree reversed orientation, the bolt assumes a new position with respect to the vehicle body so that a different unit can be mounted using the same number of parts.

5 Claims, 6 Drawing Figures 4,352,510

SUPPORT BRACKET

FIELD OF THE INVENTION

The present invention relates to a bracket for mounting a unit to a vehicle body and more specifically to a bracket which can be disposed on a given site in at least two positions so that a support or mounting bolt extending from the bracket may be located in different positions with respect to the vehicle body facilitating the mounting of different units to the vehicle without an increase in the number of parts.

BACKGROUND OF THE INVENTION

As is well known one of the factors determining the price of vehicle is the cost of producing, storing and assembling the parts thereof. Hence if one part can be used in a number of different vehicles and or serve to mount a plurality of different parts onto the vehicle without using additional spacers or the like production can be simplified since less parts must be assembled, less trouble must be taken during assembly to ensure adequate numbers of the parts are on hand, inventorying of the parts reduced and simplified and storage space minimized. Hence both direct and indirect costs can be reduced.

PRIOR ART

In one already proposed prior art arrangement depicted in FIG. 1 of the drawings a bracket B is fitted into and welded in place in a channel section member C which extends along the bottom or floor F of the vehicle. The channel member in this case is arranged to extend laterally across the vehicle, viz. from right to left.

A pin or support bolt P is disposed through and welded to the bracket B. As shown the bolt extends through an opening in the channel section member C and has a insulator S attached to the lower portion thereof. A unit D which by way of example is a final reduction gear or differential gear is supported by the bolt P through the insulator S.

This arrangement however has suffered from the drawback that should the bracket and or channel member be damaged or broken by a vehicle collision or the like, replacement of the bracket and bolt is rather difficult requiring extensive time and labour for the repair. A further drawback encountered by this arrangement is that upon the occurrence of the need to replace the unit D with a different one of different dimension additional parts such as spacers are necessary to achieve satisfactory mounting. Hence the increase in indirect costs as well as the direct costs are inevitable.

SUMMARY OF THE INVENTION

The present invention takes the form of a bracket which can be mounted onto a site in either of two positions which have a 180 degree reversed orientation with respect to each other. The bracket is provided with a support or pin bolt which is offset from the center of the base portion thereof which seats on the site so that the position of the bolt with respect to the site is variable simply by detaching the bracket, rotating it through 180 degrees and refastening it to the sight. Thus adaptation of different units to the vehicle body is facilitated without the use of additional spacers or the like. Further upon damage of the bracket replacement is facilitated because, by its nature, the bracket is not welded in place and is thus readily removable.

It is therefore an object of the present invention to provide a bracket which can be reversibly mounted to a given mounting site to vary the position of the support bolt with respect to the vehicle body.

It is another object of the present invention to provide a bracket which enables the mounting of different size units to the vehicle via reversing the mounting orientation thereof thereby excluding the use of additional spacers and the like.

Other objects, features and advantages of the present invention will become more clearly appreciated as the description of the preferred embodiment proceeds taken in conjunction with the accompanying drawings in which.

DETAILED DESCRIPTION OF THE PREFERRED EMBODIMENTS

Figure 1:
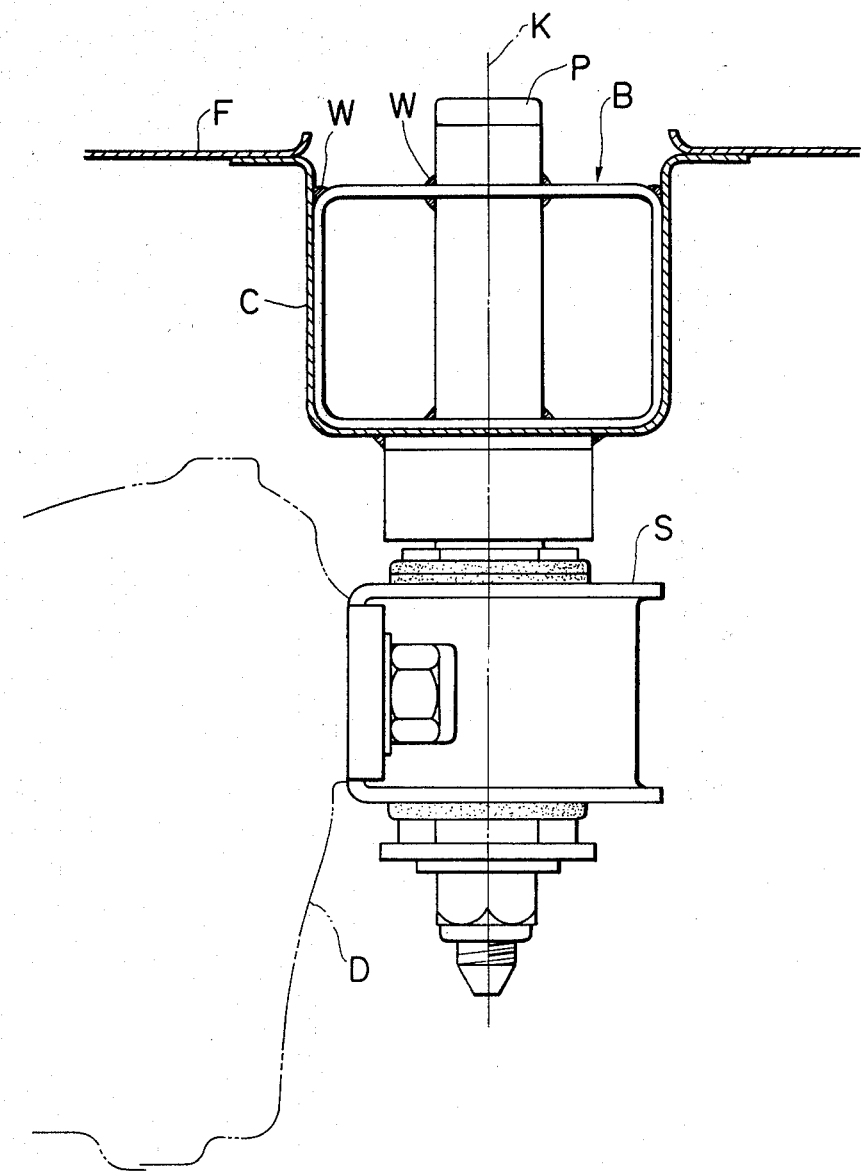
FIG. 1 is a partially sectioned view of the prior art arrangement discussed in the earlier part of the disclosure under the heading of "prior art"
Figure 2:
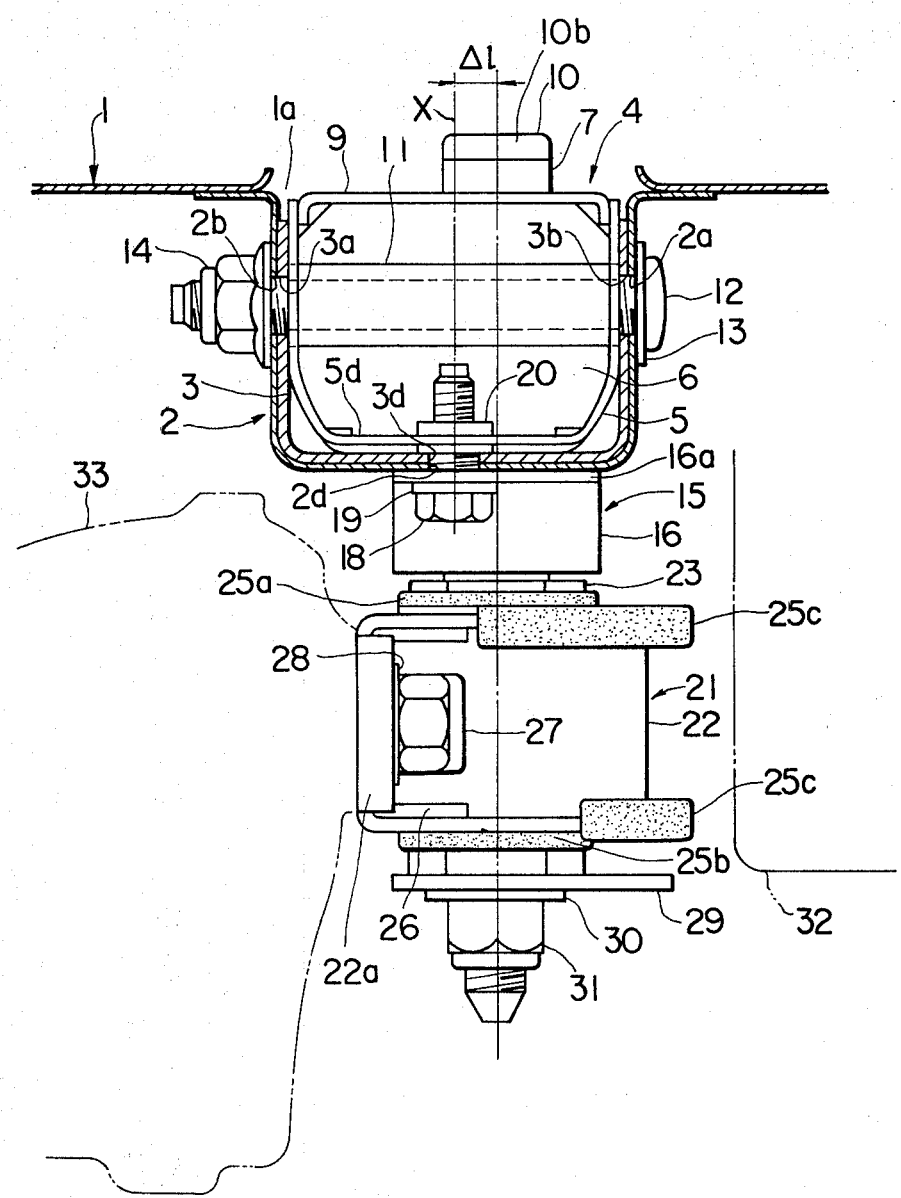
FIG. 2 is a partially sectioned side elevational view of the preferred embodiment of the present invention.

The preferred embodiment of the present invention will now described in detail with reference to FIGS. 2 to 6. FIG. 2 shows a side elevational view of the preferred embodiment wherein the numeral 1 denotes the vehicle floor and numeral 2 a channel section cross member extending laterally across the vehicle, the cross member 2 is welded or otherwise fixedly secured to the floor panel 1. An aperture 1a is formed in the floor at a position over the cross member 2. This aperture facilitates the insertion of the bracket generally denoted by the numeral 4. Disposed in the channel section cross member is a reinforcing member 3 which has a cross-section similar to that of the cross member. A main member 5 of the bracket 4 is designed to slide into the reinforcing member 3 and thus be snugly received in said channel section cross member. As will be appreciated from FIG. 4 both the main member 5 and the reinforcing member 3 have rectangular longitudinal cross-sections. Moreover, as can be best seen in FIG. 2, the bracket 4 and the cross member 2 are arranged symmetrically with respect to a common central reference plane "X".

A brace or second reinforcing member 6 is disposed within and welded to the main member 5. This brace or second reinforcing member, as shown, has a channel cross-section and is arranged so that the side wall portions thereof are normal to the side wall portions of the cross member 2, the reinforcing member 3 and the main member 5. This arrangement is best appreciated from FIG. 4. A cylindrical sleeve 7 is disposed to pass through the main member 5 as shown. The sleeve is located so as to have the longitudinal axis thereof offset from the center of the rectangular base portion 5d of the main member 5. As seen the axis of the cylindrical sleeve intersects the latitudinal axis of the base portion which passes through the just mentioned center but offset from the longitudinal axis which passes through said center. The distance by which the sleeve axis is offset from the center of the rectangular base portion is $\Delta 1$.

Figure 3:
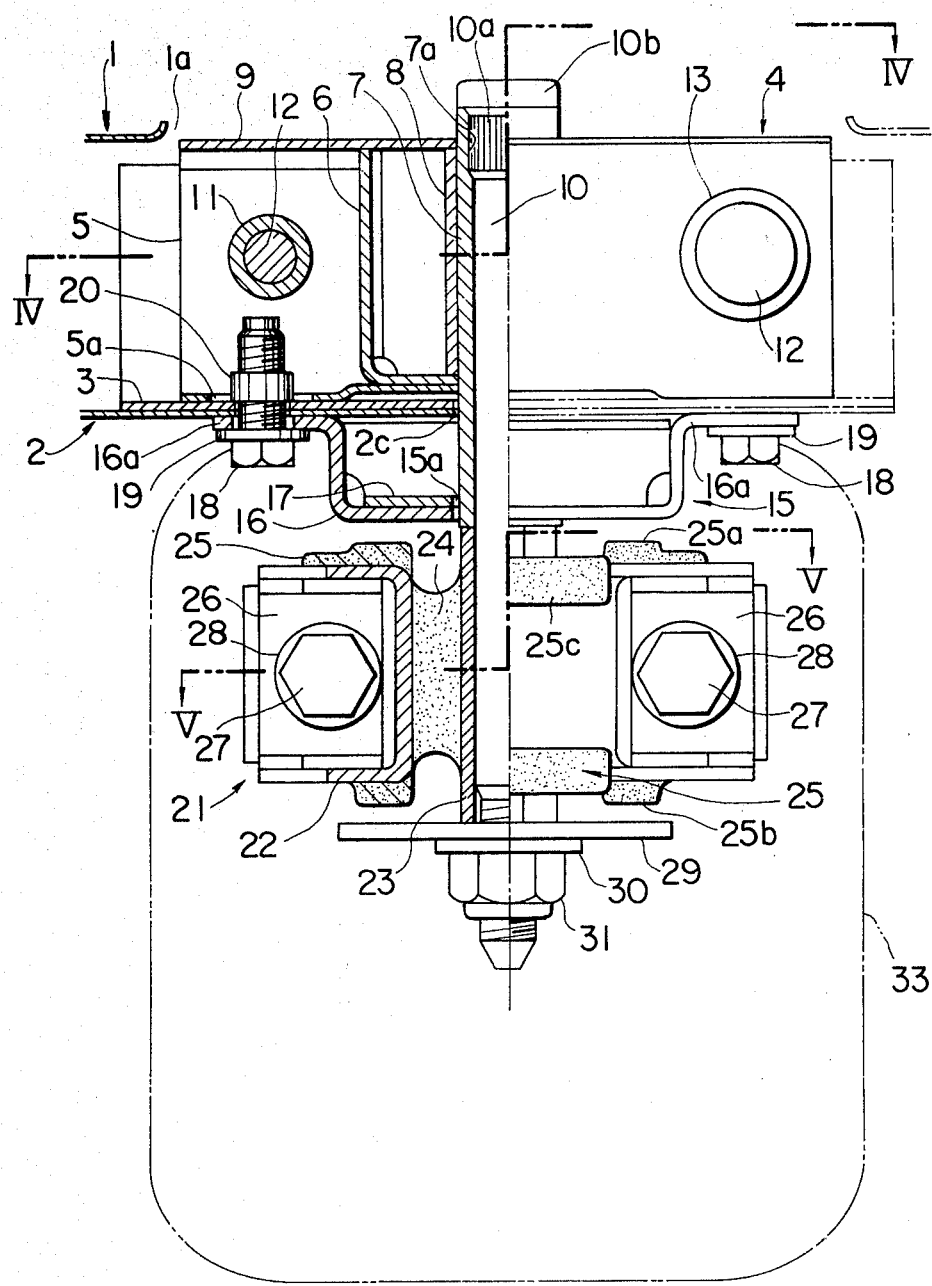
FIG. 3 is a partially sectioned front elevational view of the preferred embodiment of the present invention as seen from the rear of the vehicle.
Figure 4:
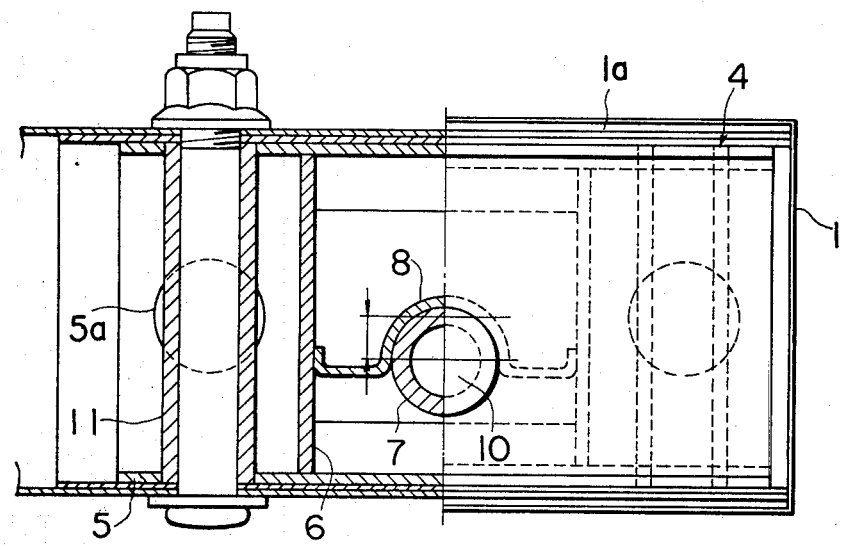
FIG. 4 is a sectional view taken along the section line IV—IV of FIG. 3.
Figure 5:
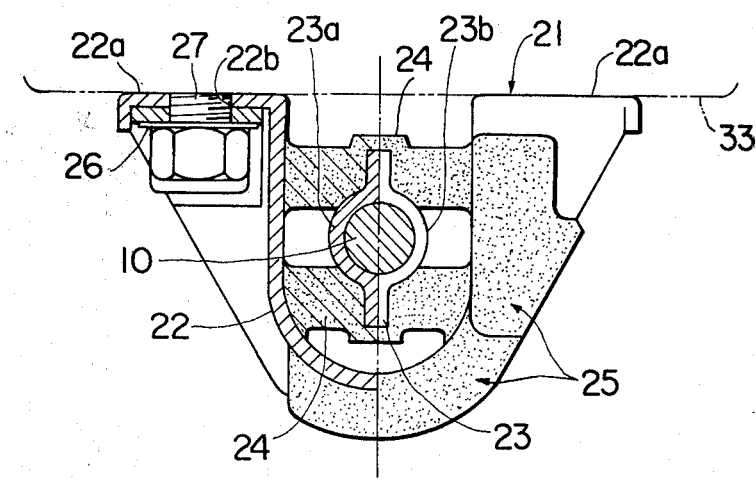
FIG. 5 is a sectional view taken along the section line V—V of FIG. 3.
Figure 6:
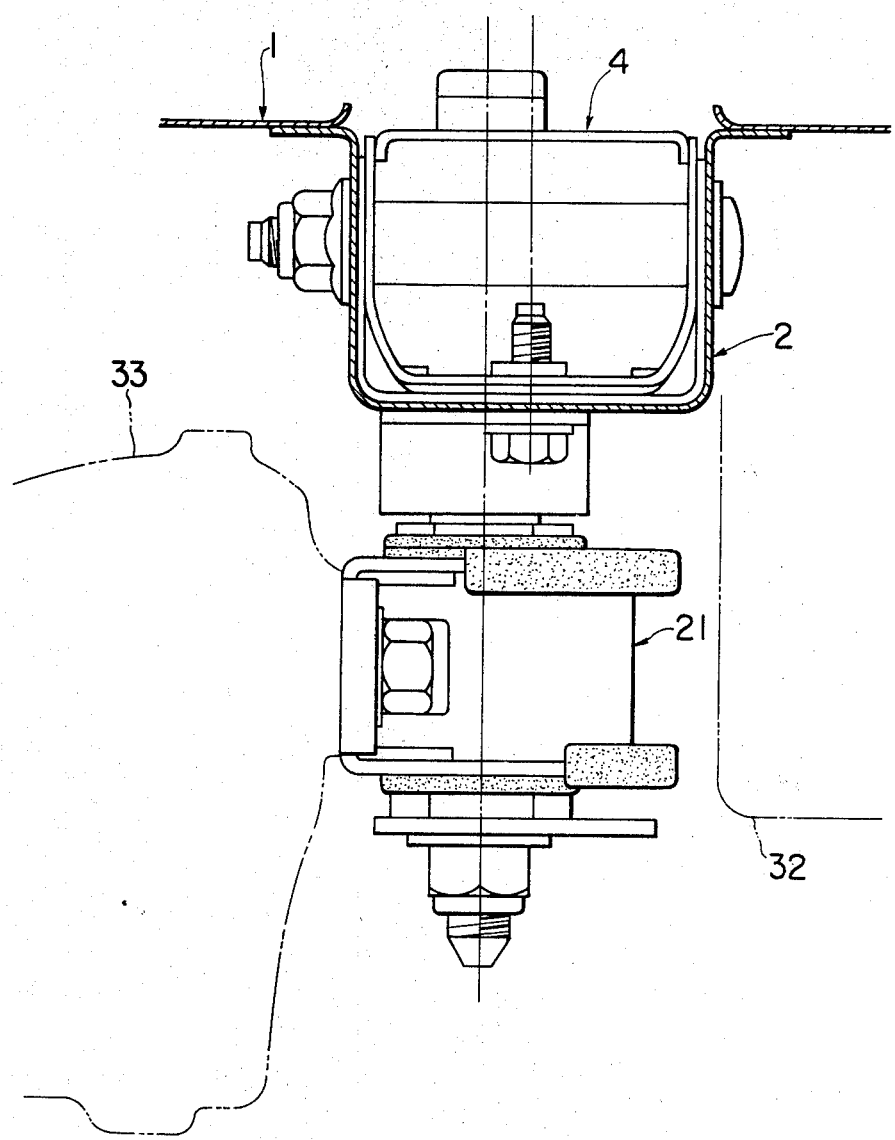
FIG. 6 is a partly sectioned view similar to that of FIG. 2 but showing the bracket mounted in 180 degree reversed orientation.

A third reinforcing member 8 which has a substantially $\Omega$ shape is welded to the cylindrical sleeve 7 and to the second reinforcing member 6. As shown the sleeve is arranged to project through holes formed in the main member 5, first and second reinforcing members 3 and 6 and the channel section cross member 2. This arrangement is best seen in FIGS. 3 and 4. A cap member 9 which closes the top of the main member 5 is also provided with a hole to permit the sleeve 7 to project slightly above the level of the cap member 9.

As best seen in FIG. 3 a pin or support bolt 10 is engaged with the upper portion of the sleeve to prevent mutual rotation therebetween via suitable means which in this case is shown to be interlocking splines 7a and 10a repectively provided on said bolt head and the upper portion of the sleeve 7. A cap closes the top of the cylindrical sleeve 7.

Two cylindrical collars 11, 11 are welded in place in the main member 5. As seen the collars are arranged on either side of the cylindrical sleeve and extend in directions normal to the direction in which the cylindrical sleeve 7 and the support bolt 10 extend. These collars receive bolts 12, 12 which are inserted through coaxial holes 2a, 2a, 2b, 2b, 3a, 3a, 3b, 3b respectively formed in the cross member 2 and the reinforcing member 3. Lock nuts 14, 14 are provided as shown.

A spacer generally denoted by 15 is mounted to the lower surface of the cross member 2. This spacer 15 has a channel section portion or member 16 which has a fourth reinforcing member 17 welded therein in a manner similar to the main member 5 and the second reinforcing member 6 welded therein. The fourth reinforcing member 17 has a channel shaped cross-section. Once again the channels of each member are arranged normal to each other. The channel shaped member 16 is formed with flange portions 16a which seat against the bottom of the cross member 2. The flanges 16a each have a through hole (no numeral) formed therein. The cross member 2 and the first reinforcing member 3 are formed with coaxial holes 2d, 2d and 3d, 3d respectively which are coaxial with the holes in the flanges 16a. Bolts 18, 18 are inserted through the holes and threadedly engaged nuts 20, 20 which are seated in holes 5a, 5a formed in the main members and which are fixedly welded to the inner surface of the first reinforcing member 3. Washers 19 are provided on the bolts as shown. The spacer 15 is provided with a hole 15a (consisting of coaxial holes formed in the channel shaped member 16 and the fourth reinforcing member 17) through which the sleeve 7 projects slightly. This hole 15a is formed in the center of the spacer 15 and, as shown, the holes through which bolts 18 are inserted are offset from the center of the spacer by the same amount as the sleeve 7 is offset from the center of the bracket 4 (viz. $\Delta 1$).

An insulator 21 (best seen in FIG. 5) is mounted on the mounting bolt 10 immediately below the spacer 15. A collar member 23 formed of two halves 23a and 23b welded together, is disposed on the support bolt 10. An elastic member 24 is received fixedly on the outer surface of the collar 23. A U-shaped bracket 22 is mounted to the support bolt through the elastic member 24 and the collar 23. The U-shaped bracket 22 is covered partially with a second elastic member or members which define stopper or stoppers 25. The stopper 25 is comprised of upper, lower and rear stopper portions 25a, 25b, 25c. The U-shaped bracket is formed with flange portions 22a, 22a to which reinforcing members 26, 26 are secured such as by welding. Holes 22b, 22b are formed through the flange portions and said reinforcing members for permitting the insertion of bolts 27, 27 carrying washers 19, 19 thereon for supporting a unit 33 such as a final drive reduction gear or the like.

A stopper plate 29 is carried on the support bolt 10 so as to abut the lower surface of the sleeve 23. A washer 30 and a lock nut 31 are provided to retain the stopper plate 29 and insulator 21 in place.

Hence upon tightening of the lock nut 31 the sleeve 23 is gripped between the stopper plate 29 and the sleeve 7. With this arrangement an appropriate clearance exists between the upper surface of the stopper portion 25a and the spacer 15 and between the stopper plate 29 and the lower stopper portion 25b. The stopper portions 25c are provided to ensure that no damage occurs to a member 32 juxtaposed the insulator, in this case the member 32 takes the form of a fuel tank.

Hence the unit 33 (e.g. final reduction gear) is suspended through the above described arrangement so that vibration is not transmitted between the unit 33 and the bracket 4 and cross member 2.

Thus when it is desired to mount a different size unit to the vehicle or mount the original unit in a slightly different position all that is necessary is the removal of a number of bolts, reversing the orientation of the bracket 4 to a 180 degree reverse orientation and the reinsertion of the bolts. This rotation through 180 degrees, of course moves the support bolt through a distance of $2 \times \Delta 1$. A comparison of FIGS. 2 and 6 will indicate at a glance the just described positional change.

It is also within the scope of the invention to displace the support bolt along the longitudinal axis of the rectangular base portion of the bracket rather than along the latitudinal axis thereof as in the just described preferred embodiment. Displacement into one of the quadrants defined between the two axes is also possible. Furthermore it is possible that shape of the base portion of the bracket be square or circular, enabling more than two positions of the support bolt than the two described.

What is claimed is:

1. For use in mounting a unit on a vehicle, the combination comprising:

an elongated channel member fixed to the vehicle, said channel member having first base and opposed side wall portions;

an elongated bracket having second base and opposed side wall portions, said bracket being dimensioned for removable seating within said channel member, with said bracket and said channel member being arranged symmetrically with respect to a common central reference plane parallel to said first and second side wall portions, with said second side wall portions being confined between said first side wall portions, and with said second base portion overlying said first base portion;

means on said bracket for supporting a carrier bolt vertically with respect to said first and second base portions and laterally of said central reference plane, with a portion of said carrier bolt protruding through aligned openings in said first and second base portions;

detachable fastening means extending through said channel member and said bracket for fixing said bracket to said channel member; and connecting means for connecting the unit to the protruding portion of said carrier bolt externally of both said channel member and said bracket, the position of said unit in relation to said vehicle being adjustable by detaching said fastening means and reversing the orientation of said bracket relative to said channel member to shift the position of said carrier bolt from one to the other side of said central reference plane.

2. The combination of claim 1 wherein said fastening means include elements extending through said first and second side wall portions in a direction normal to said central reference plane.

3. The combination of claim 2 wherein said fastening means further includes elements located in said central reference plane and extending through said first and second base portions in a direction parallel to the axis of said carrier bolt.

4. The combination of claim 1 wherein said connecting means includes a second bracket detachably secured to the protruding portion of said carrier bolt externally of said channel member.

5. The combination of claim 4 wherein said second bracket is placed from said channel member by a spacer detachably secured to said channel member.

* * * * *